(12) United States Patent
Sasaka

(10) Patent No.: US 8,450,408 B2
(45) Date of Patent: May 28, 2013

(54) PNEUMATIC TIRE

(75) Inventor: Naohiro Sasaka, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/266,701

(22) PCT Filed: Apr. 28, 2010

(86) PCT No.: PCT/JP2010/057602
§ 371 (c)(1),
(2), (4) Date: Oct. 27, 2011

(87) PCT Pub. No.: WO2010/126095
PCT Pub. Date: Nov. 4, 2010

(65) Prior Publication Data
US 2012/0046413 A1    Feb. 23, 2012

(30) Foreign Application Priority Data

Apr. 28, 2009   (JP) ................. 2009-109981

(51) Int. Cl.
*B60C 1/00* (2006.01)

(52) U.S. Cl.
USPC ........................................... 524/492

(58) Field of Classification Search
USPC ........................................... 524/492
See application file for complete search history.

(56) References Cited

U.S. PATENT DOCUMENTS

| | | | |
|---|---|---|---|
| 7,250,463 B2 | 7/2007 | Durel et al. | |
| 7,384,997 B2 | 6/2008 | Hasse et al. | |
| 8,193,265 B2 | 6/2012 | Nakayama et al. | |
| 2003/0130535 A1 | 7/2003 | Deschler et al. | |
| 2003/0135006 A1* | 7/2003 | Materne et al. | 528/10 |
| 2005/0004297 A1 | 1/2005 | Durel et al. | |
| 2005/0004386 A1 | 1/2005 | Deschler et al. | |
| 2005/0176861 A1* | 8/2005 | Nakayama et al. | 524/262 |
| 2006/0160935 A1* | 7/2006 | Hasse et al. | 524/262 |

FOREIGN PATENT DOCUMENTS

| | | |
|---|---|---|
| CN | 1541245 A | 10/2004 |
| CN | 1662595 A | 8/2005 |
| CN | 1789315 A | 6/2006 |
| EP | 1 514 898 A1 | 3/2005 |
| EP | 1 690 829 A1 | 8/2006 |
| EP | 1 958 983 A1 | 8/2008 |
| JP | 03-252431 A | 11/1991 |
| JP | 06-157825 A | 6/1994 |
| JP | 06-248116 A | 9/1994 |
| JP | 07-070369 A | 3/1995 |
| JP | 08-245838 A | 9/1996 |
| JP | 2001-131340 A | 5/2001 |
| JP | 2001-131343 A | 5/2001 |
| JP | 2001-131344 A | 5/2001 |
| JP | 2001-131345 A | 5/2001 |
| JP | 2003-176378 A | 6/2003 |
| JP | 2005-500420 A | 1/2005 |
| JP | 2005-035889 A | 2/2005 |
| JP | 2006-037046 A | 2/2006 |
| JP | 2007-138069 A | 6/2007 |
| JP | 2008-179675 A | 8/2008 |
| JP | 2008-260517 A | 10/2008 |
| JP | 2008-260517 A * | 10/2008 |
| JP | 2009-126907 A | 6/2009 |
| JP | 2009-263420 A | 11/2009 |
| WO | 2004/000930 A1 | 12/2003 |
| WO | 2009/091057 A1 | 7/2009 |
| WO | 2009/133936 A1 | 11/2009 |

OTHER PUBLICATIONS

English Translation of JP2008-260517. Aug. 20, 2012. Found at http://www19.ipdl.inpit.go.jp/PA1/cgi-bin/PA1DETAIL.*
Rhodia Product Information. Aug. 20, 2012. Found at www.rhodia.com/en/markets_and_products/product_finder/product_results.tcm?keywords=zeosil.*
Supplemental European Search Report mailed Sep. 5, 2012 in European Patent Application No. 10769793.0.
Translation of the International Preliminary Report on Patentability and Written Opinion issued Dec. 22, 2011, in International Application No. PCT/JP2010/057602.

* cited by examiner

*Primary Examiner* — Ling Choi
*Assistant Examiner* — Lanee Reuther
(74) *Attorney, Agent, or Firm* — Sughrue Mion, PLLC

(57) ABSTRACT

A pneumatic tire obtained by using a rubber composition containing 100 parts by mass of a rubber component comprising at least one of natural rubber and diene base synthetic rubber, 20 to 150 parts by mass of precipitated silica as a filler in which a cetyltrimethylammonium bromide-adsorbing specific surface area (CTAB) (m²/g) and the mode $A_{ac}$ in diameters (nm) of primary aggregates determined by acoustic measurement of particle size distribution satisfy equation (A) shown below and in which a difference between an ignition loss (mass reduction % when heated at 750° C. for 3 hours) and a heating loss (mass reduction % when heated at 105° C. for 2 hours) satisfies equation (B) shown below and 1 to 25 parts by mass of at least one specific sulfur-containing silane compound as a silane coupling agent:

$$A_{ac} \leq -0.76 \times (CTAB) + 274 \qquad (A)$$

$$(\text{ignition loss}) - (\text{heating loss}) \leq 3 \qquad (B).$$

12 Claims, No Drawings

PNEUMATIC TIRE

CROSS REFERENCE TO RELATED APPLICATIONS

This application is a National Stage of International Application No. PCT/JP2010/057602 filed Apr. 28, 2010, claiming priority based on Japanese Patent Application No. 2009-109981 filed Apr. 28, 2009, the contents of all of which are incorporated herein by reference in their entirety.

TECHNICAL FIELD

The present invention relates to a pneumatic tire, more specifically to a pneumatic tire prepared by using a rubber composition in which precipitated silica having a specific structure as a reinforcing filler and a specific silane coupling agent are used and which is excellent in low heat build-up and abrasion resistance.

BACKGROUND ART

In recent years, requirements for low fuel consumption are becoming severer in connection with the movement of global emission control of carbon dioxide which follows social requirement for energy saving and a rise in concern about environmental problems. In order to meet the above requirements, tires which are reduced in rolling resistance and have low heat build-up as tire performances have come to be demanded. While a method for optimizing a tire structure has so far been studied as a method for reducing rolling resistance of a tire, but it is carried out as the most usual method to use a material exhibiting lower heat build-up as a rubber composition.

It has so far been carried out as a method for obtaining the above rubber composition having low heat build-up to improve reinforcing fillers and rubber components.

Carbon black has so far been used as a reinforcing filler for rubber. This is because carbon black can provide rubber compositions with high abrasion resistance. When low heat build-up is intended to be achieved by using carbon black alone, it is considered that a compounding amount of carbon black is reduced or that the carbon black having a large particle diameter is used, but it is known that in both cases, abrasion resistance and grip on a wet road are not prevented from being reduced. On the other hand, it is known to use silica as a filler in order to enhance low heat build-up (for example, patent documents 1 to 4). However, particles of silica tend to be aggregated by virtue of a hydrogen bond of a silanol group which is a surface functional group of silica, and heat build-up is increased due to rubbing between silicas. Further, silica is inferior as well in a wettability with a rubber molecule, so that dispersion of silica into rubber is not good. The kneading time has to be extended in order to improve the above problem. Also, if silica is insufficiently dispersed into rubber, a rubber composition is elevated in a Mooney viscosity and inferior in processability such as extrusion. Further, since a surface of a silica particle is acidic, silica adsorbs a basic substance used as a vulcanization accelerator in vulcanizing a rubber composition to prevent the rubber composition from being sufficiently vulcanized, so that the defect that the elastic modulus is not enhanced has been involved therein.

A silane coupling agent has been developed in order to improve the above defects, but when the silane coupling agent is insufficiently reacted with silica, a reinforcing property of silica is not enhanced, so that the abrasion resistance is reduced. Further, the unreacted silane coupling agent is reacted in a kneading step of the rubber composition. The reaction of silica with the silane coupling agent can be completed by increasing the number of a kneading stage in the kneading step, but this leads to reduction in the productivity in the kneading step. Accordingly, it is tried to mix silica the surface of which is treated with a hydrophobicity-providing agent to accelerate the reaction of a silane coupling agent (patent document 1).

Further, it is disclosed in a patent document 5 to use hydrophobic precipitated silica. However, since precipitated silica subjected to complete hydrophobicity treatment is used, surface silanol groups to react with a silane coupling agent disappear, and therefore the defect that rubber is not sufficiently reinforced has been involved therein. Further, silica having an increased particle diameter is used in order to improve low heat build-up, but silica is reduced in a specific surface area by increasing a particle diameter to deteriorate a reinforcing property thereof. It is disclosed in patent document 6 to use silica having a specific form, but low heat build-up and abrasion resistance of the rubber composition are not sufficiently high.

Further, a partial ester of polybasic acid is added in order to improve dispersibility of reinforcing silica into rubber and strengthen interaction between the polymers in addition to improvement in low heat build-up to thereby provide the rubber with abrasion resistance and low heat build-up (patent document 7).

On the other hand, many modified rubbers interacting with fillers such as silica, carbon black have been developed as methods for improving rubber components. For example, proposed are rubber compositions prepared by compounding silica and/or carbon black with a modified conjugate diene base polymer obtained by reacting a conjugate diene base polymer with an imino group-containing hydrocarbyloxysilane compound (patent documents 8 to 11). However, a satisfactory modifying effect is not necessarily obtained in rubber compositions blended with silica and carbon black.

PRIOR ART DOCUMENTS

Patent Documents

Patent document 1: Japanese Patent Application Laid-Open Hei 6 No. 248116
Patent document 2: Japanese Patent Application Laid-Open Hei 7 No. 70369
Patent document 3: Japanese Patent Application Laid-Open Hei 8 No. 245838
Patent document 4: Japanese Patent Application Laid-Open Hei 3 No. 252431
Patent document 5: Japanese Patent Application Laid-Open Hei 6 No. 157825
Patent document 6: Japanese Patent Application Laid-Open No. 2006-37046
Patent document 7: Japanese Patent Application Laid-Open No. 2003-176378
Patent document 8: Japanese Patent Application Laid-Open No. 2001-131340
Patent document 9: Japanese Patent Application Laid-Open No. 2001-131343
Patent document 10: Japanese Patent Application Laid-Open No. 2001-131344
Patent document 11: Japanese Patent Application Laid-Open No. 2001-131345

OUTLINER OF THE INVENTION

Problems to be Solved by the Invention

The present invention provides a pneumatic tire prepared by using a rubber composition which is prepared by using precipitated silica having a specific structure as a reinforcing filler and improved more in dispersibility of the precipitated silica by compounding a specific silane coupling agent and which is excellent in low heat build-up and abrasion resistance.

Means for Solving the Problems

The pneumatic tire of the present invention is a tire prepared by using a rubber composition which is reduced in rolling resistance and improved in abrasion resistance as well as low heat build-up by using precipitated silica having a specific structure as a reinforcing filler and which is compounded with a specific silane coupling agent for improving dispersibility of precipitated silica into a rubber component to enhance further low heat build-up.

The pneumatic tire of the present invention is a tire obtained by using a rubber composition prepared by compounding 100 parts by mass of natural rubber and/or diene base synthetic rubber with 20 to 150 parts by mass of precipitated silica having a specific structure as silica and 1 to 25 parts by mass of a specific silane coupling agent.

Structural precipitated silica used in the present invention is characterized by having a structure (primary aggregation) which can be represented by the following index.

That is, a cetyltrimethylammonium bromide-adsorbing specific surface area (CTAB) (m²/g) and the mode $A_{ac}$ in diameters (nm) of primary aggregates determined by acoustic measurement of particle size distribution satisfy equation (A) shown below:

$$A_{ac} \geq 0.76 \times (CTAB) + 274 \quad (A)$$

and an ignition loss (mass reduction % when heated at 750° C. for 3 hours) and a heating loss (mass reduction % when heated at 105° C. for 2 hours) satisfy preferably equation (B) shown below:

$$(\text{ignition loss}) - (\text{heating loss}) \leq 3 \quad (B)$$

A rubber composition containing the above precipitated silica is excellent in both of low heat build-up and abrasion resistance.

Precipitated silica used in the present invention is obtained by a method in which precipitated silica is deposited and precipitated by neutralizing an aqueous solution of an alkali salt of silicic acid such as sodium silicate with a mineral acid such as sulfuric acid, that is, a method according to a production method of so-called precipitated hydrated silica.

The silane coupling agent used in the present invention comprises a compound containing at least an element or a functional group which can be bonded with silane and a protected mercapto group and a sulfur or mercapto group-containing alkoxysilane compound, and these compounds are used alone or in combination of two or more kinds thereof.

Effects of the Invention

According to the present invention, a rubber composition which is excellent in dispersibility of silica and processability is obtained, and when it is used for a tire tread member, tires which are excellent in low heat build-up and abrasion resistance can be obtained.

MODE FOR CARRYING OUT THE INVENTION

The embodiment of the present invention shall be explained below in detail.

The rubber component of the rubber composition used for a tire in the present invention is preferably natural rubber and/or diene base synthetic rubber. The specific examples of the diene base synthetic rubber include synthetic polyisoprene rubber, polybutadiene rubber, styrene-butadiene rubber and the like. The above rubber components may be used alone or in a mixture of two or more kinds thereof.

The structural precipitated silica used in the present invention is present in the form of lumps even after compounded into rubber since particles are chemically bonded, and the heat build-up can be controlled to a lower level. It can be confirmed by that characteristic values measured by a method usually used for measuring silica, carbon black and the like satisfy the following relations.

That is, it is precipitated silica in which a cetyltrimethylammonium bromide-adsorbing specific surface area (CTAB) (m²/g) and a diameter $A_{ac}$ (nm) of the mode in the number of primary aggregates determined by an acoustic measurement of particle size distribution satisfy equation (A) shown below:

$$A_{ac} \geq -0.76 \times (CTAB) + 274 \quad (A)$$

and in which an ignition loss (mass reduction % when heated at 750° C. for 3 hours) and a heating loss (mass reduction % when heated at 105° C. for 2 hours) satisfy equation (B) shown below:

$$(\text{ignition loss}) - (\text{heating loss}) \leq 3 \quad (B)$$

The cetyltrimethylammonium bromide-adsorbing specific surface area (CTAB) is a specific surface area (m²/g) of precipitated silica calculated from an adsorbing amount of cetyltrimethylammonium bromide onto a surface of precipitated silica.

CTAB can be measured according to a method described in ASTM D3765-92. The method described in ASTM D3765-92 is a method for measuring CTAB of carbon black, and therefore it shall be slightly modified. That is, a standard product of carbon black is not used, and a cetyltrimethylammonium bromide (hereinafter abbreviated as CE-TRAB) standard solution is prepared. This is used to standardize a precipitated silica OT (sodium di-2-ethylhexylsulfosuccinate) solution to calculate a specific surface area from an adsorbing amount of CE-TRAB assuming that an adsorbing cross-sectional area per one molecule of CE-TRAB onto a surface of precipitated silica is 0.35 nm².

Precipitated silica used in the present invention has CTAB of 50 to 250 m²/g, preferably 100 to 200 m²/g. If CTAB is less than 50 m²/g, the rubber composition is likely to be notably reduced in a storage modulus, and if it is larger than 250 m²/g, the unvulcanized rubber composition is likely to be risen in a viscosity.

A diameter (particle size distribution diameter by acoustic measurement) measured as a particle diameter of precipitated silica by means of an acoustic measuring equipment of particle size distribution is an index for development of a structural property. The particles of precipitated silica contain particles prepared by primary aggregation of particles having a fine particle diameter and particles prepared by slight secondary aggregation of the above particles.

Measurement by the acoustic measuring equipment of particle size distribution is carried out after subjecting a 0.01M KCl aqueous solution of precipitated silica to dispersion treatment by a supersonic wave for 5 minutes to remove bubbles and to breaking secondary aggregates. Particle diameters of primary aggregates of precipitated silica and distribution of particle numbers thereof are obtained, and assuming that among them, a diameter of the particles observed in the highest frequency is set to $A_{ac}$ (nm), the following equation is satisfied, $$A_{ac} \geq -0.76 \times (\text{CTAB}) + 274 \qquad (A)$$

and the rubber composition is improved in both of low heat build-up and abrasion resistance. When $A_{ac}$ does not satisfy the above condition, the rubber composition is reduced in either or both of low heat build-up and abrasion resistance. Further, $A_{ac}$ is preferably 1 μm or less. If it is larger than 1 μm, precipitated silica is likely to become a breaking nucleus to damage the kinetic properties of the rubber composition.

Further, a difference between a reduction (%) in a mass of precipitated silica used in the present invention when heating it and a reduction (%) in a mass thereof when igniting it is preferably:

$$(\text{ignition loss}) - (\text{heating loss}) \leq 3 \qquad (B)$$

The heating loss and the ignition loss are measured according to a test method of a compounding ingredient for rubber in JIS K6220-1, wherein the heating loss is a reduction (%) in the mass when heated usually at 105±2° C. for 2 hours, and the ignition loss is a reduction (%) in the mass when ignited usually at 750±25° C. for 3 hours.

The precipitated silica used in the present invention is produced according to a production process for precipitation process hydrated silica. For example, sodium silicate and sulfuric acid are added in fixed amounts and fixed time to a reaction vessel filled in advance with a fixed amount of warm water while controlling pH and temperature, and then the reaction is further continued to obtain a hydrated silica slurry.

Subsequently, the above hydrated silica slurry is separated by filtrating through a filtering device capable of washing a cake, such as a filter press and washed to remove by-produced electrolytes, and then a slurry is prepared from the hydrated silica cake obtained and dried by means of a dryer such as a spray dryer to thereby produce precipitated silica.

A product commercially available as Premium 200MP from Rhodia Co., Ltd. can be used as well.

A use amount of precipitated silica used in the present invention is preferably 20 to 150 parts by mass based on 100 parts by mass of the rubber component. If this compounding amount is less than 20 parts by mass, the abrasion resistance is deteriorated, and therefore that is not preferred. On the other hand, if it exceeds 150 parts by mass, an effect of reducing the rolling resistance is decreased.

In the present invention, a silane coupling agent is used together with precipitated silica having the characteristics described above. The silane coupling agent is reacted with silanol groups remaining on a surface of the precipitated silica and the rubber component polymer to act as a bonding bridge between the precipitated silica and the rubber and to form a reinforcing phase.

The silane coupling agent used in the present invention comprises a compound containing at least an element or a functional group which can be bonded with silane and a protected mercapto group and a sulfur or mercapto group-containing alkoxysilane compound.

Among the silane coupling agents used in the present invention, the compound containing at least an element or a functional group which can be bonded with silane and a protected mercapto group is represented by the following Formula (I) or (II):

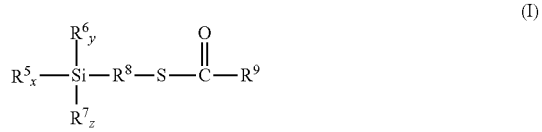

(wherein $R^5$ represents —Cl, —Br, $R^{10}$O—, $R^{10}$C(=O)O—, $R^{10}R^{11}$C=NO—, $R^{10}R^{11}$N— or —(OSiR$^{10}$R$^{11}$)$_b$(OSiR$^9$R$^{10}$R$^{11}$) ($R^{10}$ and $R^{11}$ each are independently a hydrogen atom or a monovalent hydrocarbon group having 1 to 18 carbon atoms, and b is 1 to 4); $R^6$ represents $R^5$, a hydrogen atom or a monovalent hydrocarbon group having 1 to 18 carbon atoms; $R^7$ represents $R^5$, $R^6$ or a —[O(R$^{12}$O)$_a$]$_{0.5}$— ($R^{12}$ is an alkylene group having 1 to 18 carbon atoms, and a is an integer of 1 to 4); $R^8$ represents a divalent hydrocarbon group having 1 to 18 carbon atoms; $R^9$ represents a monovalent hydrocarbon group having 1 to 18 carbon atoms; and x, y and z are numbers satisfying a relation of x+y+2z=3, $0 \leq x \leq 3$, $0 \leq y \leq 2$ and $0 \leq z \leq 1$);

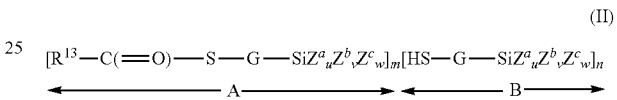

(wherein $R^{13}$ is a linear, branched or cyclic alkyl group having 1 to 20 carbon atoms; G each is independently an alkanediyl group or an alkenediyl group each having 1 to 9 carbon atoms; $Z^a$ each is independently a group which can be bonded with two silicon atoms and is a group selected from [—I—]$_{0.5}$, [—O-G—]$_{0.5}$ or [—O-G—O—]$_{0.5}$; $Z^b$ each is independently a group which can be bonded with two silicon atoms and is a functional group represented by [—O-G—O—]$_{0.5}$; $Z^c$ each is independently —Cl, —Br or a functional group represented by —OR$^{14}$, R$^{14}$C(=O)O—, R$^{14}$R$^{15}$C=NO—, R$^{14}$R$^{15}$N—, R$^{14}$— or HO-G-O—, and R$^{14}$ and R$^{15}$ are a linear, branched or cyclic alkyl group having 1 to 20 carbon atoms; m, n, u, v and w each are independently $1 \leq m \leq 20$, $0 \leq n \leq 20$, $0 \leq u \leq 3$, $0 \leq v \leq 2$ and $0 < w \leq 1$, and ½u+v+2w=2 or 3; when plural A parts are present, $Z^a_u$, $Z^b_v$ and $Z^c_w$ in the plural A parts may be same or different each other, and when plural B parts are present, $Z^a_u$, $Z^b_v$ and $Z^c_w$ in the plural B parts may be same or different each other).

In Formula (I) described above, for example, an alkyl group having 1 to 18 carbon atoms, an alkenyl group having 2 to 18 carbon atoms, an aryl group having 6 to 18 carbon atoms, an aralkyl group having 7 to 18 carbon atoms and the like can be listed as the monovalent hydrocarbon group having 1 to 18 carbon atoms. In this regard, the alkyl group and the alkenyl group described above may be any of a linear group, a branched group and a cyclic group, and the aryl group and the aralkyl group described above may have substituents such as a lower alkyl group on an aromatic ring.

The specific examples of the monovalent hydrocarbon group includes methyl, ethyl, n-propyl, isopropyl, n-butyl, isobutyl, sec-butyl, tert-butyl, pentyl, hexyl, octyl, decyl, dodecyl, cyclopentyl, cyclohexyl, vinyl, propenyl, allyl, hexenyl, octenyl, cyclopentenyl, cyclohexenyl and the like.

The examples of the aryl group include phenyl, tolyl, xylyl, naphthyl and the like. Further, the aralkyl group includes benzyl, phenethyl, naphthylmethyl and the like.

In Formula (I) described above, the alkylene group having 1 to 18 carbon atoms represented by R$^{12}$ may be any of a linear group, a branched group and a cyclic group, and the linear group is particularly suited. The examples of the linear alkylene group include methylene, ethylene, trimethylene, tetramethylene, pentamethylene, hexamethylene, octamethylene, decamethylene, dodecamethylene and the like.

Further, capable of being listed as the divalent hydrocarbon group having 1 to 18 carbon atoms represented by $R^8$ are, for example, an alkylene group having 1 to 18 carbon atoms, an alkenylene group having 2 to 18 carbon atoms, a cycloalkylene group having 5 to 18 carbon atoms, a cycloalkylalkylene group having 6 to 18 carbon atoms, an arylene group having 6 to 18 carbon atoms, an aralkylene group having 7 to 18 carbon atoms and the like. The alkylene group and the alkenylene group may be any of a linear group and a branched group, and the cycloalkylene group, the cycloalkylalkylene group, the arylene group and the aralkylene group may have substituents such as a lower alkyl group and the like on rings. $R^8$ is preferably an alkylene group having 1 to 6 carbon atoms, and particularly a linear alkylene group, for example, methylene, ethylene, trimethylene, tetramethylene, pentamethylene and hexamethylene can be listed.

Capable of being listed as the examples of the silane coupling agent represented by Formula (I) described above are
3-hexanoylthiopropyltriethoxysilane,
3-octanoylthiopropyltriethoxysilane,
3-decanoylthiopropyltriethoxysilane,
3-lauroylthiopropyltriethoxysilane,
2-hexanoylthioethyltriethoxysilane,
2-octanoylthioethyltriethoxysilane,
2-decanoylthioethyltriethoxysilane,
2-lauroylthioethyltriethoxysilane,
3-hexanoylthiopropyltrimethoxysilane,
3-octanoylthiopropyltrimethoxysilane,
3-decanoylthiopropyltrimethoxysilane,
3-lauroylthiopropyltrimethoxysilane,
2-hexanoylthioethyltrimethoxysilane,
2-octanoylthioethyltrimethoxysilane,
2-decanoylthioethyltrimethoxysilane,
2-lauroylthioethyltrimethoxysilane and the like.

Compounds represented by the following Formulas (III), (IV) and (V) can be listed as the silane coupling agent represented by Formula (II) described above:

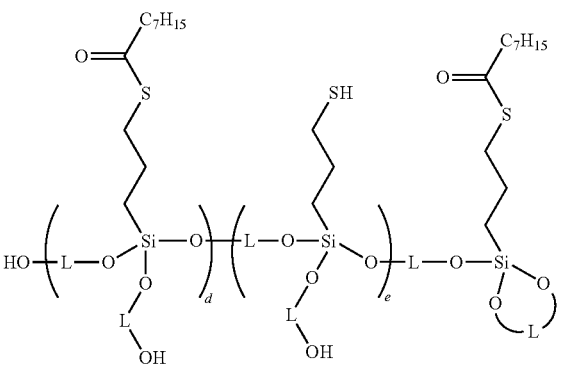

(III)

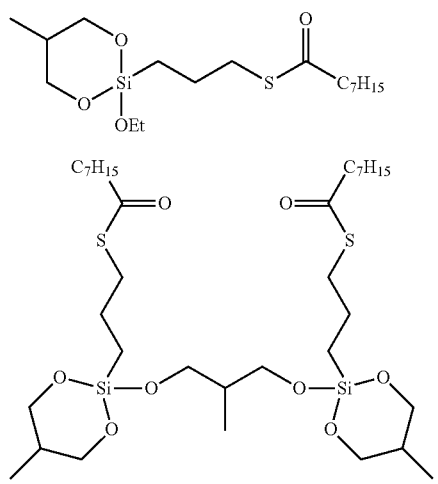

(IV)

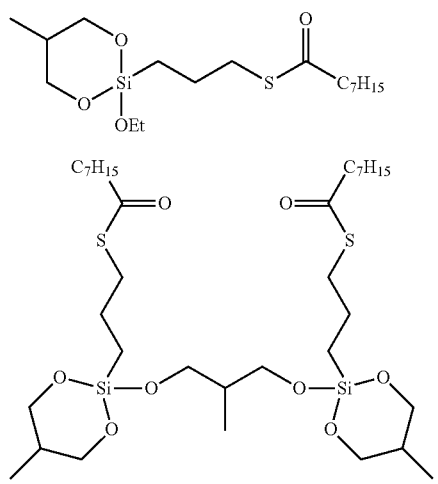

(V)

(wherein Et represents ethyl; L each is independently an alkanediyl group or an alkenediyl group having 1 to 9 carbon atoms; d=m−1 and e=n, and m and n have the same definitions as described above).

The silane coupling agent represented by Formula (III) includes a trade name "NXT Low-V Silane" manufactured by Momentive Performance Materials Inc.

The silane coupling agent represented by Formula (IV) includes trade name "NXT Ultra Low-V Silane" manufactured by Momentive Performance Materials Inc.

Further, the silane coupling agent represented by Formula (V) includes trade name "NXT-Z" manufactured by Momentive Performance Materials Inc.

The silane coupling agents represented by Formulas (IV) and (V) have alkyls having a large number of carbon atoms in alkoxysilane, and therefore they produce less volatile compound VOC (particularly alcohol) and are preferred in terms of working environment. Particularly the silane coupling agent represented by Formula (V) has a large effect of providing the low heat build-up and therefore is more preferred.

Further, since the silane coupling agent represented by Formula (V) is protected in a mercapto group, it has to be deprotected and subjected to coupling with the polymer, and therefore a proton donor represented by DPG (diphenylguanidine) is preferably compounded as a deprotecting agent at a final kneading step. A use amount thereof is preferably 0.1 to 5.0 parts by mass, more preferably 0.2 to 3.0 parts by mass based on 100 parts by mass of the rubber component.

Next, the silane coupling agent comprising a sulfur-containing alkoxysilane compound includes compounds represented by Average Composition Formula (VI):

$$(R^1O)_{3-p}(R^2)_p Si—R^3—S_q—R^4—S_q—R^3—Si(R^2)_p (OR^1)_{3-p} \quad (VI)$$

($R^1$ and $R^2$ each are a hydrocarbon group having 1 to 4 carbon atoms; $R^3$ is a divalent hydrocarbon group having 1 to 15 carbon atoms; p is an integer of 0 to 2, and q is 1 or more and less than 4 in terms of an average value; and $R^4$ is a divalent functional group represented by any of the following Formulas (VII) to (IX)):

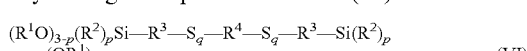

(VII)

(VIII)

(IX)

The sulfur-containing alkoxysilane compound used in the present invention is a compound represented by Average Composition Formula (VI) which has an organooxysilyl group at both ends of a molecule and which has sulfide or polysulfide in a central part of a molecule.

In the above composition formula, $R^1$ and $R^2$ each are a hydrocarbon group having 1 to 4 carbon atoms and include, for example, methyl, ethyl, n-propyl, i-propyl, n-butyl, i-butyl, t-butyl, vinyl, allyl, isopropenyl and the like. $R^1$ and $R^2$ may be same or different. $R^3$ is a divalent hydrocarbon group having 1 to 15 carbon atoms and includes, for example, methylene, ethylene, propylene, n-butylene, i-butylene, hexylene, decylene, phenylene, methylphenylethyene and the like. The suffix p is an integer of 0 to 2, and q is 1 or more and less than 4 in terms of an average value. An average value of q may fall suitably in the above range, and the silane coupling agent may be a mixture of the plural sulfur-containing alkoxysilane compounds in which q is different. From the viewpoint of the effects of the present invention described later, q is preferably 1 or more and less than 2 in terms of an average value, and q is most preferably 1.

$R^4$ in Composition Formula (VI) is a divalent functional group represented by any of Formulas (VII) to (IX) described above. From the viewpoint of the effects of the present invention described later, $R^4$ is preferably represented by Formula (IX) described above.

In this regard, $R^e$ to $R^j$ are a linear or branched divalent hydrocarbon group having 1 to 20 carbon atoms, a divalent aromatic group or a divalent organic group containing a hetero element other than sulfur and oxygen, and they include, for example, methylene, ethylene, propylene, n-butylene, i-butylene, hexylene, decylene, phenylene, methylphenylethyene and groups into which nitrogen, phosphorus and the like are introduced as a hetero element other than sulfur and oxygen. $R^e$ to $R^j$ in $R^4$ (any of the functional groups represented by Formulas (VII) to (IX)) in Composition Formula (VI) may be same or different each other, and $R^e$ to $R^j$ are preferably hexylene from the viewpoint of the effects of the present invention described later and the production cost.

$R^4$ contains indispensably a sulfur atom, and f, g and h are 1 or more and less than 4 in terms of an average value. From the viewpoint of the effects of the present invention described later, f, g and h each are preferably 2 or more and less than 4, most preferably 2 or more and 3 or less in terms of an average value.

The sulfur-containing alkoxysilane compound used in the present invention has preferably a purity of 60% or more, more preferably 70% or more and particularly preferably 80% or more in compounding from the viewpoint of the effects.

Polymers such as dimers, trimers of the compounds represented by Composition Formula (VI) are produced in a certain case in producing the sulfur-containing alkoxysilane compound described above, and the above sulfur-containing alkoxysilane compounds having 3 or more silicon atoms in a molecule exerts an adverse effect on the effects of the present application in a certain case. In the present invention, a content of the sulfur-containing alkoxysilane compounds having 3 or more silicon atoms in a molecule is preferably 30% by mass or less, more preferably 10% by mass or less based on a total part of the silane compounds in compounding the sulfur-containing alkoxysilane compound according to the present invention, and most preferably, they are not substantially contained.

The sulfur-containing alkoxysilane compounds represented by Composition Formula (VI) can be produced by methods of production examples described later.

Further, an organosilane compound represented by the following Formula (X) can also be used as the silane coupling agent comprising a sulfur-containing alkoxysilane compound:

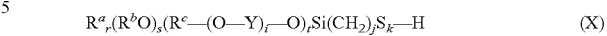

(wherein $R^a$ is methyl or ethyl; $R^bO$ is methoxy or ethoxy; $R^c$ is a $C_1$ to $C_9$-alkyl group, preferably methyl or ethyl; Y is a branched or non-branched and saturated or unsaturated divalent hydrocarbon group having 2 to 3 carbon atoms, preferably $CH_2$, $CH_2CH_2$, $CH_2CH(CH_3)$ or $CH(CH_3)CH_2$; the followings are an integer and i is 1 to 40, preferably 2 to 30, more preferably 3 to 25, particularly preferably 4 to 20 and very preferably 10 to 20; r is 0, 1 or 2; s is 0 or 1; t is 1 or 2; j is of 1 to 9; and k is 1 to 4).

The organosilane compound represented by Formula (X) may be a mixture of the organosilane compounds represented by Formula (X). The mixture may contain the organosilane compounds in which i is same or different. The mixture can contain the compounds in which a Y group is same or different.

Condensation products, that is, oligosiloxane and polysiloxane can be formed from the organosilane compound represented by Formula (X). The oligosiloxane and the polysiloxane can be obtained by oligomerization or simultaneous oligomerization of corresponding alkoxysilane, with water and an additive added or a method known to persons having ordinary skill in the art. Oligomerized products and polymerized products formed by the above methods may be contained in the organosilane compound represented by Formula (X).

The organosilane compound represented by Formula (X) may be an oligomerized or polymerized product of the organosilane compound represented by Formula (X). The organosilane compound represented by Formula (X) may be a mixture of the organosilane compound represented by Formula (X) and an oligomerized or polymerized product of the organosilane compound represented by Formula (X) which is not condensed.

The compounds represented by Formula (X) include the following ones.

$R^c$ is any of $C_4H_9$, $C_5H_{11}$, $C_6H_{13}$, $C_7H_{15}$, $C_8H_{17}$ or $C_9H_{19}$:

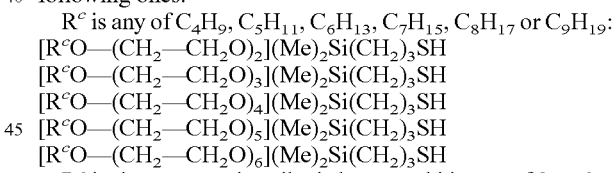

$R^c$ is the same as described above, and i is any of 2 to 6:

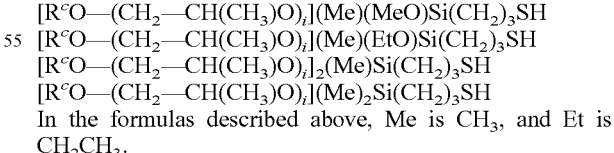

Further, listed are the compounds represented by Formula (X) in which $R^c$ is any of $C_3H_7$, $C_4H_9$, $C_5H_{11}$, $C_6H_{13}$, $C_7H_{15}$, $C_8H_{17}$ or $C_9H_{19}$ and in which i is any of 1 to 20:

[$R^c$O—($CH_2$—$CH(CH_3)$O)$_i$](Me)(MeO)Si($CH_2$)$_3$SH
[$R^c$O—($CH_2$—$CH(CH_3)$O)$_i$](Me)(EtO)Si($CH_2$)$_3$SH
[$R^c$O—($CH_2$—$CH(CH_3)$O)$_i$]$_2$(Me)Si($CH_2$)$_3$SH
[$R^c$O—($CH_2$—$CH(CH_3)$O)$_i$](Me)$_2$Si($CH_2$)$_3$SH

In the formulas described above, Me is $CH_3$, and Et is $CH_2CH_3$.

The organosilane compounds represented by Formula (X) can be produced by methods described in production examples described later.

In the present invention, the silane coupling agent may be used alone or in combination of two or more kinds thereof. A compounding amount thereof is selected in a range of 1 to 25 parts by mass in terms of the total amount of the silane coupling agent based on 100 parts by mass of the rubber component. If a compounding amount of the above silane coupling agent falls in the range described above, the effects of the present invention described above are sufficiently exerted. The preferred compounding amount falls in a range of 2 to 15 parts by mass.

Carbon black and other inorganic fillers can be used as a reinforcing filler together with precipitated silica for the rubber composition used for a tire of the present invention.

All commercially available products can be used as the carbon black, and among them, carbon blacks of SAF, ISAF, IISAF, HAF and FEF grades, particularly carbon blacks of HAF, IISAF, ISAF and SAF grades are preferably used. A DBP absorption amount of the carbon black is preferably 80 cm$^3$/100 g or more, more preferably 100 cm$^3$/100 g or more and particularly preferably 110 cm$^3$/100 g or more, and a nitrogen adsorption specific surface area thereof is preferably 85 m$^2$/g or more, more preferably 100 m$^2$/g or more and particularly preferably 110 m$^2$/g or more.

The other inorganic fillers include clay ($Al_2O_3.2SiO_2$), kaolin ($Al_2O_3.2SiO_2.2H_2O$), pyrophyllite ($Al_2O_3.4SiO_2.H_2O$), bentonite ($Al_2O_3.4SiO_2.2H_2O$), aluminum silicate ($Al_2SiO_5$, $Al_4.3SiO_4.5H_2O$ and the like), magnesium silicate ($Mg_2SiO_4$, $MgSiO_3$ and the like), calcium silicate ($Ca_2SiO_4$ and the like), calcium aluminum silicate ($Al_2O_3.CaO.2SiO_2$ and the like), calcium magnesium silicate ($CaMgSiO_4$), aluminum hydroxide and the like.

The filler is compounded so that a proportion of a compounding amount of precipitated silica to the total compounding amount of the fillers is 20% by mass or more. If a compounding proportion of precipitated silica is less than 20% by mass, the effect of reducing the rolling resistance is unsatisfactory.

Various chemicals usually used in the rubber industry, for example, vulcanizing agents, vulcanization accelerators, process oils, antioxidants, scorch inhibitors, zinc oxide, stearic acid and the like can be added, if necessary, to the rubber composition used for a tire of the present invention as long as the objects of the present invention are not damaged.

The vulcanizing agents described above include sulfur and the like, and a use amount thereof is preferably 0.1 to 10.0 parts by mass, more preferably 0.5 to 5.0 parts by mass in terms of a sulfur content based on 100 parts by mass of the rubber component.

The vulcanization accelerator which can be used in the present invention shall not specifically be restricted, and capable of being listed are, for example, vulcanization accelerators of a thiazole base such as M (2-mercaptobenzothiazole), DM (dibenzothiazyl disulfide), CZ (N-cyclohexyl-2-benzothiazylsulfenamide) and a guanidine base such as DPG (diphenylguanidine). A use amount thereof is preferably 0.1 to 5.0 parts by mass, more preferably 0.2 to 3.0 parts by mass based on 100 parts by mass of the rubber component.

Also, products of a paraffin base, a naphthene base, an aromatic base and the like can be listed as the process oil which can be used in the present invention. The aromatic base products are used for applications in which great importance is placed on the tensile strength and the abrasion resistance, and the naphthene base or paraffin base products are used for applications in which great importance is placed on the hysteresis loss and the low temperature characteristics. A use amount thereof is preferably 0 to 100 parts by mass based on 100 parts by mass of the rubber component, and if it is 100 parts by mass or less, tensile strength and low heat build-up of the vulcanized rubber are improved.

The rubber composition used for the tire of the present invention is obtained by kneading the components by means of a mixer such as a Banbury mixer, a roll mill, an internal mixer, and it is vulcanized after subjected to molding processing and used as a tire tread and a base rubber.

The pneumatic tire of the present invention is produced by an ordinary method using the rubber composition described above. That is, the rubber composition containing various compounding ingredients is processed into a tire tread at a non-vulcanized stage, and it is stuck for molding by a conventional method on a tire molding machine, whereby a green tire is molded. The green tire is heated and pressurized in vulcanizing equipment, whereby a tire is obtained.

The pneumatic tire prepared by using the rubber composition described above for a tread member has high abrasion resistance and low rolling resistance and is excellent in a controlling property and driving stability on a wet surface. Inert gas such as nitrogen in addition to air can be used as gas filled into the tire.

EXAMPLES

The present invention shall be explained below in further details with reference to examples and comparative examples, but the present invention shall by no means be restricted to the following examples.

In the following examples and comparative examples, the physical properties of precipitated silica and rolling resistance and abrasion resistance of the tire were measured and evaluated by the following methods.

Physical Properties of Precipitated Silica:
(1) Acoustic Measurement of Particle Size Distribution Diameter:

A 0.01M KCl aqueous solution of each precipitated silica was subjected to dispersion treatment for 5 minutes by a ultrasonic wave to remove bubbles, and then the mode $A_{ac}$ (nm) in diameters of primary aggregates of the precipitated silica was measured by means of a supersonic measuring equipment of particle size distribution DT1200 (manufactured by Dispersion Technology, Inc.).

(2) Measurement of CTAB:

CTAB was measured according to a method described in ASTM D3765-92. The method described in ASTM D3765-92 is a method for measuring CTAB of carbon black, and therefore it was slightly modified. That is, IRB #3 (83.0 m$^2$/g) which was a standard product of carbon black was not used, and a cetyltrimethylammonium bromide (hereinafter abbreviated as CE-TRAB) standard solution was prepared separately. This solution was used to standardize a precipitated silica OT (sodium di-2-ethylhexylsulfosuccinate) solution to calculate a specific surface area (m$^2$/g) from an adsorbing amount of CE-TRAB assuming that an adsorbing cross-sectional area per one molecule of CE-TRAB onto a surface of precipitated silica was 0.35 nm$^2$. This is because it is considered that carbon black and precipitated silica are different in a surface, and therefore different in an adsorbing amount of CE-TRAB even if they have the same surface area.

(3) Measurement of Heating Loss and Ignition Loss:

A sample of precipitated silica was weighed and heated at 105±2° C. for 2 hours in the case of a heating loss and at 750±25° C. for 3 hours in the case of an ignition loss, and then the masses thereof were measured to represent a difference from a mass of the sample before heated by % based on a mass thereof before heated.

(4) Rolling Resistance Test:

A tire of 195/65R15 was prepared, and rolling resistance thereof was measured and evaluated by a coasting method in which used was a rotating drum having a steel smooth surface and an inner pressure of 1.7 kg/cm$^2$ and having an outer diameter of 1707.6 mm and a width of 350 mm and in which the drum was rotated at a speed of 80 km/hour under applying a load of 460 kg.

The measured value was shown by an index in which the value in Comparative Example 1 was set to 100. It is shown that the larger the numerical value is, the better (smaller) the rolling resistance is.

(5) Abrasion Resistance:

The tire was mounted in a car and allowed to run 10,000 km on a road, and then the remaining grooves were measured to relatively compare running distances required for allowing the tread to be abraded by 1 mm and show them by an index in which a value thereof obtained in Comparative Example 1 was set to 100. It is shown that the larger the index is, the better the abrasion resistance is.

Production of Precipitated Silica:

Production Example A

A jacket-installed stainless-made reaction vessel of volume 180 L equipped with a stirrer was charged with 93 L of water and 0.6 L of a sodium silicate aqueous solution ($SiO_2$ 160 g/L, $SiO_2/Na_2O$ mole ratio: 3.3) and heated up to 96° C. A concentration of $Na_2O$ in the resulting solution was 0.005 mol/L.

While maintaining the above solution at a temperature of 96° C., dropwise added at the same time were the same sodium silicate aqueous solution as described above at a flow rate of 540 ml/minute and sulfuric acid (18 mol/L) at a flow rate of 24 ml/minute. A $Na_2O$ concentration in the reaction solution was maintained in a range of 0.00 to 0.01 mol/L with controlling the flow rates to carry out neutralization reaction. The solution started becoming clouded in the middle of the reaction and was increased in a viscosity in 47 minutes, and the solution was gelatinized. Addition was further continued, and the reaction was terminated in 90 minutes. After terminating the reaction, a temperature of the reaction liquid was maintained at 96° C. for 30 minutes. A concentration of silica in the resulting solution was 55 g/L. Subsequently, sulfuric acid having the concentration described above was added until pH of the solution was 3 to obtain a silica slurry. The silica slurry thus obtained was filtrated by means of a filter press, and the filtrated solid was washed with water to obtain a wet cake. Then, the wet cake was turned into a slurry by means of emulsifying equipment, and the slurry was dried by means of a spray dryer to obtain wet process precipitated silica A.

Production Example B

The same vessel as used in Production Example A was charged with 93 L of water and 0.6 L of the sodium silicate aqueous solution which were the same raw materials as used in Production Example A and heated up to 90° C. A concentration of $Na_2O$ in the resulting solution was 0.005 mol/L.

While maintaining the above solution at a temperature of 90° C., dropwise added at the same time were the same sodium silicate aqueous solution as described above at a flow rate of 540 ml/minute and sulfuric acid (18 mol/L) at a flow rate of 24 ml/minute. A $Na_2O$ concentration in the reaction solution was maintained in a range of 0.00 to 0.01 mol/L with controlling the flow rates to carry out neutralization reaction. The solution started becoming clouded in the middle of the reaction and was increased in a viscosity in 47 minutes, and the solution was gelatinized. Addition was further continued, and the reaction was terminated in 90 minutes. After terminating the reaction, a temperature of the reaction liquid was maintained at 90° C. for 30 minutes. A concentration of silica in the resulting solution was 55 g/L. Subsequently, sulfuric acid having the concentration described above was added until pH of the solution was 3 to obtain a silica slurry. Then, wet process precipitated silica B was obtained by the same method as in Production Example A.

Production Example C

The same vessel as used in Production Example A was charged with 93 L of water and 0.6 L of the sodium silicate aqueous solution which were the same raw materials as used in Production Example A and heated up to 84° C. A concentration of $Na_2O$ in the resulting solution was 0.005 mol/L.

While maintaining the above solution at a temperature of 84° C., dropwise added at the same time were the same sodium silicate aqueous solution as described above at a flow rate of 540 ml/minute and sulfuric acid (18 mol/L) at a flow rate of 24 ml/minute. A $Na_2O$ concentration in the reaction solution was maintained in a range of 0.00 to 0.01 mol/L with controlling the flow rates to carry out neutralization reaction. The solution started becoming clouded in the middle of the reaction and was increased in a viscosity in 48 minutes, and the solution was gelatinized. Addition was further continued, and the reaction was terminated in 90 minutes. After terminating the reaction, a temperature of the reaction liquid was maintained at 84° C. for 30 minutes. A concentration of silica in the resulting solution was 55 g/L. Subsequently, sulfuric acid having the concentration described above was added until pH of the solution was 3 to obtain a silica slurry. Then, wet process precipitated silica C was obtained by the same method as in Production Example A.

Production Example D

The same vessel as used in Production Example A was charged with 93 L of water and 0.6 L of the sodium silicate aqueous solution which were the same raw materials as used in Production Example A and heated up to 90° C. A concentration of $Na_2O$ in the resulting solution was 0.005 mol/L.

While maintaining the above solution at a temperature of 90° C., dropwise added at the same time were the same sodium silicate aqueous solution as described above at a flow rate of 540 ml/minute and sulfuric acid (18 mol/L) at a flow rate of 24 ml/minute. A $Na_2O$ concentration in the reaction solution was maintained in a range of 0.00 to 0.01 mol/L with controlling the flow rates to carry out neutralization reaction. The solution started becoming clouded in the middle of the reaction and was increased in a viscosity in 47 minutes, and the solution was gelatinized. Addition was further continued, and the reaction was terminated in 90 minutes. After terminating the reaction, a temperature of the reaction liquid was maintained at 90° C. for 60 minutes. A concentration of silica in the resulting solution was 55 g/L. Subsequently, sulfuric acid having the concentration described above was added until pH of the solution was 3 to obtain a silica slurry. Then, wet process precipitated silica D was obtained by the same method as in Production Example A.

Production Example E

The same vessel as used in Production Example A was charged with 93 L of water and 0.6 L of the sodium silicate aqueous solution which were the same raw materials as used in Production Example A and heated up to 78° C. A concentration of $Na_2O$ in the resulting solution was 0.005 mol/L.

While maintaining the above solution at a temperature of 78° C., dropwise added at the same time were the same sodium silicate aqueous solution as described above at a flow rate of 540 ml/minute and sulfuric acid (18 mol/L) at a flow rate of 24 ml/minute. A $Na_2O$ concentration in the reaction solution was maintained in a range of 0.00 to 0.01 mol/L with controlling the flow rates to carry out neutralization reaction. The solution started becoming clouded in the middle of the reaction and was increased in a viscosity in 49 minutes, and the solution was gelatinized. Addition was further continued, and the reaction was terminated in 90 minutes. After terminating the reaction, a temperature of the reaction liquid was maintained at 78° C. for 60 minutes. A concentration of silica in the resulting solution was 55 g/L. Subsequently, sulfuric acid having the concentration described above was added until pH of the solution was 3 to obtain a silica slurry. Then, wet process precipitated silica E was obtained by the same method as in Production Example A.

Production Example F

The same vessel as used in Production Example A was charged with 93 L of water and 0.6 L of a sodium silicate aqueous solution ($SiO_2$: 160 g/L and $SiO_2/Na_2O$ mole ratio: 3.3) and heated up to 65° C. A concentration of $Na_2O$ in the resulting solution was 0.005 mol/L.

While maintaining the above solution at a temperature of 65° C., dropwise added at the same time were the same sodium silicate aqueous solution as described above at a flow rate of 540 ml/minute and sulfuric acid (18 mol/L) at a flow rate of 24 ml/minute. A $Na_2O$ concentration in the reaction solution was maintained in a range of 0.00 to 0.01 mol/L with controlling the flow rates to carry out neutralization reaction. The reaction solution started becoming clouded in the middle of the reaction and was increased in a viscosity in 50 minutes, and the solution was gelatinized. Addition was further continued, and the reaction was terminated in 90 minutes. After terminating the reaction, a temperature of the reaction liquid was maintained at 65° C. for 60 minutes. A concentration of silica in the resulting solution was 55 g/L. Subsequently, sulfuric acid having the concentration described above was added until pH of the solution was 3 to obtain a silica slurry. Then, wet process precipitated silica F was obtained by the same method as in Production Example A.

Production Example G

The same vessel as used in Production Example A was charged with 86 L of water and 0.5 L of the sodium silicate aqueous solution which were the same raw materials as used in Production Example A and heated up to 96° C. A concentration of $Na_2O$ in the resulting solution was 0.005 mol/L.

While maintaining the above solution at a temperature of 96° C., dropwise added at the same time were the same sodium silicate aqueous solution as described above at a flow rate of 615 ml/minute and sulfuric acid (18 mol/L) at a flow rate of 27 ml/minute. A $Na_2O$ concentration in the reaction solution was maintained in a range of 0.00 to 0.01 mol/L with controlling the flow rates to carry out neutralization reaction. The reaction solution started becoming clouded in the middle of the reaction and was increased in a viscosity in 40 minutes, and the solution was gelatinized. Addition was further continued, and the reaction was terminated in 90 minutes. After terminating the reaction, a temperature of the reaction liquid was maintained at 96° C. for 30 minutes. A concentration of silica in the resulting solution was 62 g/L. Subsequently, sulfuric acid having the concentration described above was added until pH of the solution was 3 to obtain a silica slurry. Then, wet process precipitated silica G was obtained by the same method as in Production Example A.

The physical properties of the precipitated silica obtained in the respective production examples are shown in Table 1.

TABLE 1

| | Production Example | | | | | | |
|---|---|---|---|---|---|---|---|
| | A | B | C | D | E | F | G |
| Kind of precipitated silica | A | B | C | D | E | F | G |
| CTAB ($m^2/g$) | 112 | 134 | 157 | 127 | 172 | 210 | 80 |
| Particle size distribution diameter $A_{ac}$ (nm) | 208 | 178 | 158 | 192 | 149 | 125 | 213 |
| $-0.76 \times$ CTAB + 274 | 189 | 172 | 155 | 177 | 143 | 114 | 212 |
| Ignition loss – heating loss (% by mass) | 2.6 | 2.6 | 2.1 | 2.2 | 2.9 | 2.9 | 2.8 |

Synthesis of Silane Coupling Agent:

Synthetic Example 1

A separable flask of 0.5 liter equipped with a nitrogen gas introducing tube, a thermometer, a Dimroth condenser and a dropping funnel was charged with 80 g of ethanol, 5.46 g (0.07 mole) of anhydrous sodium sulfide and 2.24 g (0.07 mole) of sulfur, and the solution was heated up to 80° C. 33.7 g (0.14 mole) of propyltriethoxysilane chloride (($CH_3CH_2O)_3Si$—$(CH_2)_3$—Cl) and 10.8 g (0.07 mole) of 1,6-dichlorohexane ($ClCH_2$—$(CH_2)_4$—$CH_2Cl$) were slowly dropwise added thereto while stirring the above solution. After finishing dropwise adding, the solution was stirred at 80° C. for 10 hours. After finishing stirring, the solution was cooled to separate salts produced by filtering, and then ethanol of the solvent was removed by distillation under reduced pressure.

The solution thus obtained was subjected to infrared absorption spectrum analysis (IR analysis), $^1$H nuclear magnetic resonance spectrum analysis ($^1$H-NMR analysis) and supercritical chromatography analysis, and as a result, a compound represented by an average composition formula ($CH_3CH_2O)_3Si$—$(CH_2)_3$—S—S—$(CH_2)_6$—S—S—$(CH_2)_3$—$Si(OCH_2CH_3)_3$ was confirmed to be obtained. That is, in Average Composition Formula (VI), $R^1$ is ethyl; $R^3$ is n-propyl; $R^4$ is S—$(CH_2)_6$—S (corresponding to Formula (VII), wherein $R^e$ is $(CH_2)_6$); p=0 and q=1. The above compound had a purity of 82.5% which was measured by gel permeation chromatography analysis (GPC analysis).

Synthetic Example 2

Synthesis was carried out in the same manner as in Synthetic Example 1, except that 14.77 g (0.07 mole) of 1,10-dichlorodecane ($ClCH_2$—$(CH_2)_8$—$CH_2Cl$) was used in place of 1,6-dichlorohexane in Synthetic Example 1.

The solution thus obtained was subjected to IR analysis, $^1$H-NMR analysis and supercritical chromatography analysis, and as a result, a compound represented by an average composition formula ($CH_3CH_2O)_3Si$—$(CH_2)_3$—S—S—$(CH_2)_{10}$—S—S—$(CH_2)_3$—$Si(OCH_2CH_3)_3$ was confirmed to be obtained. That is, in Average Composition Formula (VI), $R^1$ is ethyl; $R^3$ is n-propyl; $R^4$ is S—$(CH_2)_{10}$—S (corresponding to Formula (VII), wherein $R^e$ is $(CH_2)_{10}$); p=0 and q=1. The above compound had a purity of 84.2% which was measured by GPC analysis.

Synthetic Example 3

Synthesis was carried out in the same manner as in Synthetic Example 1, except that an addition amount of sulfur in Synthetic Example 1 was changed to 4.48 g (0.14 mole).

The solution thus obtained was subjected to IR analysis, $^1$H-NMR analysis and supercritical chromatography analysis, and as a result, a compound represented by an average composition formula $(CH_3CH_2O)_3Si-(CH_2)_3-S_2-S-(CH_2)_6-S-S_2-(CH_2)_3-Si(OCH_2CH_3)_3$ was confirmed to be obtained. That is, in Average Composition Formula (VI), $R^1$ is ethyl; $R^3$ is n-propyl; $R^4$ is $S-(CH_2)_6-S$ (corresponding to Formula (VII), wherein $R^e$ is $(CH_2)_6$); p=0 and q=2. The above compound had a purity of 81.0% which was measured by GPC analysis.

Synthetic Example 4

Synthesis was carried out in the same manner as in Synthetic Example 1, except that an addition amount of sulfur in Synthetic Example 1 was changed to 6.72 g (0.21 mole).

The solution thus obtained was subjected to IR analysis, $^1$H-NMR analysis and supercritical chromatography analysis, and as a result, a compound represented by an average composition formula $(CH_3CH_2O)_3Si-(CH_2)_3-S_3-S-(CH_2)_6-S-S_3-(CH_2)_3-Si(OCH_2CH_3)_3$ was confirmed to be obtained. That is, in Average Composition Formula (VI), $R^1$ is ethyl; $R^3$ is n-propyl; $R^4$ is $S-(CH_2)_6-S$ (corresponding to Formula (VII), wherein $R^e$ is $(CH_2)_6$); p=0 and q=3. The above compound had a purity of 80.5% which was measured by GPC analysis.

Synthetic Example 5

A separable flask of 2 liter equipped with a nitrogen gas introducing tube, a thermometer, a Dimroth condenser and a dropping funnel was charged with 119 g (0.5 mole) of 3-mercaptopropyltriethoxysilane, and 151.2 g (0.45 mole) of an ethanol solution of sodium ethoxide having an effective component of 20% was added thereto while stirring. Then, the solution was heated up to 80° C. and was stirred for 3 hours. After cooled, the solution was transferred into the dropping funnel.

Next, the same separable flask as described above was charged with 69.75 g (0.45 mole) of 1,6-dichlorohexane, and after the solution was heated up to 80° C., the reaction product of 3-mercaptopropyltriethoxysilane and sodium ethoxide each described above was slowly dropwise added thereto. After finishing dropwise adding, the solution was stirred at 80° C. for 5 hour. Then, the solution was cooled down to separate salts from the resulting solution by filtering, and ethanol and excess 1,6-dichlorohexane were removed by distillation under reduced pressure. The solution thus obtained was distilled under reduced pressure to obtain 137.7 g of a colorless transparent liquid having a boiling point of 148 to 150° C./0.005 torr. The liquid was subjected to IR analysis, $^1$H-NMR analysis and mass spectrometric analysis (MS analysis), and as a result, a compound represented by $(CH_3CH_2O)_3Si-(CH_2)_3-S-(CH_2)_6-Cl$ was obtained. Further, it had a purity of 97.7% which was measured by gas chromatograph analysis (GC analysis).

Then, the same separable flask of 0.5 liter as described above was charged with 80 g of ethanol, 5.46 g (0.07 mole) of anhydrous sodium sulfide and 2.24 g (0.07 mole) of sulfur, and the solution was heated up to 80° C. 49.91 g (0.14 mole) of $(CH_3CH_2O)_3Si-(CH_2)_3-S-(CH_2)_6-Cl$ described above was slowly dropwise added thereto while stirring the above solution. After finishing dropwise adding, the solution was stirred at 80° C. for 10 hours. After finishing stirring, the solution was cooled down to separate salts produced by filtering, and then ethanol of the solvent was removed by distillation under reduced pressure.

The reddish brown transparent solution thus obtained was subjected to IR analysis, $^1$H-NMR analysis and supercritical chromatography analysis, and as a result, a compound represented by an average composition formula $(CH_3CH_2O)_3Si-(CH_2)_3-S-(CH_2)_6-S_2-(CH_2)_6-S-(CH_2)_3-Si(OCH_2CH_3)_3$ was confirmed to be obtained. That is, in Average Composition Formula (VI), $R^1$ is ethyl; $R^3$ is n-propyl; $R^4$ is $(CH_2)_6-S_2-(CH_2)_6$ ($R^4$ corresponds to Formula (VIII), wherein $R^f$ and $R^g$ are $(CH_2)_6$, and f=2); p=0 and q=1. The above compound had a purity of 85.7% which was measured by GPC analysis.

Synthetic Example 6

Synthesis was carried out in the same manner as in Synthetic Example 5, except that an addition amount of sulfur in Synthetic Example 5 was changed to 4.48 g (0.14 mole).

The solution thus obtained was subjected to IR analysis, $^1$H-NMR analysis and supercritical chromatography analysis, and as a result, a compound represented by an average composition formula $(CH_3CH_2O)_3Si-(CH_2)_3-S-(CH_2)_6-S_3-(CH_2)_6-S-(CH_2)_3-Si(OCH_2CH_3)_3$ was confirmed to be obtained. That is, in Average Composition Formula (VI), $R^1$ is ethyl; $R^3$ is n-propyl; $R^4$ is $(CH_2)_6-S_3-(CH_2)_6$ ($R^4$ corresponds to Formula (VIII), wherein $R^f$ and $R^g$ are $(CH_2)_6$, and f=3); p=0 and q=1. The above compound had a purity of 84.9% which was measured by GPC analysis.

Synthetic Example 7

In Synthetic Example 5, 94.95 g (0.45 mole) of 1,10-dichlorodecane was used in place of 1,6-dichlorohexane and reacted in the same manner as in Synthetic Example 5 to obtain a compound represented by $(CH_3CH_2O)_3Si-(CH_2)_3-S-(CH_2)_{10}-Cl$.

Then, 57.75 g (0.14 mole) of $(CH_3CH_2O)_3Si-(CH_2)_3-S-(CH_2)_{10}-Cl$ described above was used in place of $(CH_3CH_2O)_3Si-(CH_2)_3-S-(CH_2)_6-Cl$ in Synthetic Example 5 to carry out synthesis in the same manner as in Synthetic Example 5.

The reddish brown transparent solution thus obtained was subjected to IR analysis, $^1$H-NMR analysis and supercritical chromatography analysis, and as a result, a compound represented by an average composition formula $(CH_3CH_2O)_3Si-(CH_2)_3-S-(CH_2)_{10}-S_2-(CH_2)_{10}-S-(CH_2)_3-Si(OCH_2CH_3)_3$ was confirmed to be obtained. That is, in Average Composition Formula (VI), $R^1$ is ethyl; $R^3$ is n-propyl; $R^4$ is $(CH_2)_{10}-S_2-(CH_2)_{10}$ ($R^4$ corresponds to Formula (VIII), wherein $R^f$ and $R^g$ are $(CH_2)_{10}$, and f=2); p=0 and q=1. The above compound had a purity of 82.9% which was measured by GPC analysis.

Synthetic Example 8

A separable flask of 0.5 liter equipped with a nitrogen gas introducing tube, a thermometer, a Dimroth condenser and a dropping funnel was charged with 80 g of ethanol, 5.46 g (0.07 mole) of anhydrous sodium sulfide and 2.24 g (0.07 mole) of sulfur, and the solution was heated up to 80° C. 54.39 g (0.14 mole) of a compound represented by an average composition formula $(CH_3CH_2O)_3Si-(CH_2)_3-S_2-(CH_2)_6-Cl$ was slowly dropwise added thereto while stirring the above solution. After finishing dropwise adding, the solution was stirred at 80° C. for 10 hours. After finishing stirring, the solution was cooled down to separate salts produced by filtering, and then ethanol of the solvent was removed by distillation under reduced pressure to obtain 50.8 g of a reddish brown transparent solution. The above solution was subjected to IR analysis, $^1$H-NMR analysis and supercritical chromatography analysis, and as a result, a compound represented by an average composition formula $(CH_3CH_2O)_3Si—(CH_2)_3—S_2—(CH_2)_6—S_2—(CH_2)_6—S_2—(CH_2)_3—Si(OCH_2CH_3)_3$ was confirmed to be obtained. That is, in Average Composition Formula (VI), $R^1$ is ethyl; $R^3$ is n-propyl; $R^4$ is $(CH_2)_6—S_2—(CH_2)_6$ ($R^4$ corresponds to Formula (VIII), wherein $R^f$ and $R^g$ are $(CH_2)_6$, and f=2); p=0 and q=2. The above compound had a purity of 86.9% which was measured by gel permeation chromatography analysis (GPC analysis).

Synthetic Example 9

Synthesis was carried out in the same manner as in Synthetic Example 8 to obtain 55.1 g of a brown transparent solution, except that in Synthetic Example 8, an addition amount of anhydrous sodium sulfide was changed to 10.92 g (0.14 mole); an addition amount of sulfur was changed to 4.48 g (0.14 mole); and a mixed liquid of 49.91 g (0.14 mole) of a compound represented by a formula $(CH_3CH_2O)_3Si—(CH_2)_3—S—(CH_2)_6—Cl$ and 10.85 g (0.07 mole) of 1,6-dichlorohexane was used in place of the compound represented by a formula $(CH_3CH_2O)_3Si—(CH_2)_3—S_2—(CH_2)_6—Cl$. The above solution was subjected to IR analysis, $^1$H-NMR analysis and supercritical chromatography analysis, and as a result, a compound represented by an average composition formula $(CH_3CH_2O)_3Si—(CH_2)_3—S—(CH_2)_6—S_2—(CH_2)_6—S_2—(CH_2)_6—S—(CH_2)_3—Si(OCH_2CH_3)_3$ was confirmed to be obtained. That is, in Average Composition Formula (VI), $R^1$ is ethyl; $R^3$ is n-propyl; $R^4$ is $(CH_2)_6—S_2—(CH_2)_6—S_2—(CH_2)_6$ ($R^4$ corresponds to Formula (IX), wherein $R^h$, $R^i$ and $R^j$ are $(CH_2)_6$, g=2 and h=2); p=0 and q=1. The above compound had a purity of 85.5% which was measured by GPC analysis.

Synthetic Example 10

Synthesis of $HS—(CH_2)_3—Si(Me)(OMe)[(O—CH(CH_3)—CH_2)_5—O—C_4H_9]$:

86.64 g of $HS—CH_2—CH_2—CH_2—Si(Me)(OMe)_2$, 163.29 g of polypropylene glycol monobutyl ether (Mw=340 g/mole) and 0.23 g of p-toluenesulfonic acid were mixed in a round bottom flask. The mixture was treated at an oil bath temperature of 150 to 155° C. for 6.5 hours under 100 to 400 millibar on a rotary evaporator. Liberated volatile alcohol was separated by distillation. A mass of the isolated product was 236 g.

Synthetic Example 11

Synthesis of $HS—(CH_2)_3—Si(Me)(OMe)[(O—CH(CH_3)—CH_2)_{16}—O—C_4H_9]$:

86.64 g of $HS—CH_2—CH_2—CH_2—Si(Me)(OMe)_2$, 480.03 g of polypropylene glycol monobutyl ether (Mw=1000 g/mole) and 0.23 g of p-toluenesulfonic acid were mixed in a round bottom flask. The mixture was treated at an oil bath temperature of 145 to 155° C. for 4.5 hours under 100 to 400 millibar on a rotary evaporator. Liberated volatile alcohol was separated by distillation. A mass of the isolated product was 552 g.

Synthetic Example 12

Synthesis of $HS—(CH_2)_3—Si(Me)(OMe)[(O—CH_2—CH_2)_4—O—CH_2—CH(Et)—C_4H_9]$:

86.62 g of $HS—CH_2—CH_2—CH_2—Si(Me)(OMe)_2$, 147 G of polyethylene glycol mono-2-ethylhexyl ether and 0.5 g of $Ti(OBu)_4$ were mixed in a round bottom flask. The mixture was treated at an oil bath temperature of 125 to 135° C. for 4.5 hours under 150 to 300 millibar on a rotary evaporator. Liberated Volatile alcohol was separated by distillation. A mass of the isolated product was 214 g.

Synthetic Example 13

Synthesis of $HS—(CH_2)_3—Si(Me)(OEt)[(O—CH_2—CH_2)_2—O—C_6H_{13}]$:

50 g of $HS—CH_2—CH_2—CH_2—Si(Me)(OEt)_2$, 45.7 g of diethylene glycol monohexyl ether and 0.23 g of $Ti(OBu)_4$ were mixed in a round bottom flask. The mixture was treated at an oil bath temperature of 130 to 135° C. for 6 hours under 100 to 300 millibar on a rotary evaporator. Liberated volatile alcohol was separated by distillation. A mass of the isolated product was 80 g.

Synthetic Example 14

Synthesis of $HS—(CH_2)_3—Si(Me)(OEt)[(O—CH(CH_3)—CH_2)_{16}—O—C_4H_9]$:

80 g of $HS—CH_2—CH_2—CH_2Si(Me)(OEt)_2$, 384.07 g of polypropylene glycol monobutyl ether (Mw=1000 g/mole) and 0.2 g of p-toluenesulfonic acid were mixed in a round bottom flask. The mixture was treated at an oil bath temperature of 145 to 155° C. for 6 hours under 100 to 300 millibar on a rotary evaporator. Liberated Volatile alcohol was separated by distillation. A mass of the isolated product was 448 g.

Synthetic Example 15

Synthesis of $HS—(CH_2)_3—Si(Me)(OEt)[(O—CH_2—CH_2)_4—O—CH_2—CH(Et)—C_4H_9]$:

50 g of $HS—CH_2—CH_2—CH_2—Si(Me)(OEt)_2$, 73.5 g of polyethylene glycol mono-2-ethylhexyl ether and 0.3 g of $Ti(OBu)_4$ were mixed in a round bottom flask. The mixture was treated at an oil bath temperature of 125 to 135° C. under 150 to 300 millibar on a rotary evaporator. Liberated Volatile alcohol was separated by distillation. A mass of the product obtained was 108 g.

Examples 1 to 16 and Comparative Examples 1 to 8

The components were kneaded in recipes shown in Table 2 and Table 3 by means of a Banbury mixer to prepare rubber compositions. The respective rubber compositions were used to produce tires of 195/65R15, and rolling resistance and abrasion resistance thereof were measured. The results thereof are shown in Table 2 and Table 3.

TABLE 2

| | Comparative Example | | | | | | | |
|---|---|---|---|---|---|---|---|---|
| | 1 | 2 | 3 | 4 | 5 | 6 | 7 | 8 |
| NR | 20 | 20 | 20 | 20 | 20 | 20 | 20 | 20 |
| SBR 1 *1 | 82.5 | 82.5 | 82.5 | 82.5 | 82.5 | 82.5 | 82.5 | 82.5 |
| SBR 2 *2 | 30 | 30 | 30 | 30 | 30 | 30 | 30 | 30 |
| Aroma oil | 5 | 5 | 5 | 5 | 5 | 5 | 5 | 5 |
| Carbon black *3 | 10 | 10 | 10 | 10 | 75 | 10 | 10 | 10 |
| Silica *4 | 80 | 70 | | | | | | 80 |
| Precipitated silica 1 *5 | | 10 | 80 | 80 | 15 | 150 | 80 | |
| Precipitated silica 2 *6 | | | | | | | | |
| Precipitated silica 3 *7 | | | | | | | | |

TABLE 2-continued

| | Comparative Example | | | | | | | |
|---|---|---|---|---|---|---|---|---|
| | 1 | 2 | 3 | 4 | 5 | 6 | 7 | 8 |
| Silane coupling agent 1 *8 | 6.5 | 6.5 | | | | | | 6.5 |
| Silane coupling agent 2 *9 | | | 0.5 | 30 | 1.2 | 12 | | 6.5 |
| Silane coupling agent 3 *10 | | | | | | | | |
| Silane coupling agent 4 *11 | | | | | | | | |
| Silane coupling agent 5 *12 | | | | | | | | |
| Stearic acid | 2.0 | 2.0 | 2.0 | 2.0 | 2.0 | 2 | 2 | 2 |
| Antioxidant 6C *13 | 1.0 | 1.0 | 1.0 | 1.0 | 1.0 | 1.0 | 1.0 | 1.0 |
| Zinc oxide | 3.0 | 3.0 | 3.0 | 3.0 | 3.0 | 3.0 | 3.0 | 3.0 |
| Vulcanization accelerator DPG *14 | 1.0 | 1.0 | 1.0 | 1.0 | 1.0 | 1.0 | 1.0 | 1.0 |
| Vulcanization accelerator CZ *15 | 1.5 | 1.5 | 1.5 | 1.5 | 1.5 | 1.5 | 1.5 | 1.5 |
| Vulcanization accelerator DG *16 | 0.8 | 0.8 | 0.8 | 0.8 | 0.8 | 0.8 | 0.8 | 0.8 |
| Sulfur | 1.5 | 1.5 | 1.5 | 1.5 | 1.5 | 1.5 | 1.5 | 1.5 |
| Rolling resistance | 100 | 101 | 102 | 95 | 92 | 90 | 102 | 104 |
| Abrasion resistance | 100 | 100 | 88 | 103 | 99 | 97 | 103 | 96 |

TABLE 3

| | Example | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| NR | 20 | 20 | 20 | 20 | 20 | 20 | 20 | 20 | 20 | 20 | 20 | 20 | 20 | 20 | 20 | 20 |
| SBR 1 *1 | 82.5 | 82.5 | 82.5 | 82.5 | 82.5 | 82.5 | 82.5 | 82.5 | 82.5 | 82.5 | 82.5 | 82.5 | 82.5 | 82.5 | 82.5 | 82.5 |
| SBR 2 *2 | 30 | 30 | 30 | 30 | 30 | 30 | 30 | 30 | 30 | 30 | 30 | 30 | 30 | 30 | 30 | 30 |
| Aroma oil | 5 | 5 | 5 | 5 | 5 | 5 | 5 | 5 | 5 | 5 | 5 | 5 | 5 | 5 | 5 | 5 |
| Carbon black *3 | 10 | 10 | 10 | 10 | 10 | 10 | 10 | 10 | 10 | 10 | 10 | 10 | 10 | 10 | 10 | 10 |
| Silica *4 | | | | | | | | | | | | | | | | |
| Precipitated silica 1 *5 | 80 | 80 | 80 | 80 | | | | | 30 | 140 | 80 | 80 | | | | |
| Precipitated silica 2 *6 | | | | | 80 | 80 | 80 | 80 | | | | | | | | |
| Precipitated silica 3 *7 | | | | | | | | | | | | | 80 | 80 | 80 | 80 |
| Silane coupling agent 1 *8 | | | | | | | | | | | | | | | | |
| Silane coupling agent 2 *9 | 6.5 | | | | 6.5 | | | | 6.5 | 6.5 | 3 | 20 | 6.5 | | | |
| Silane coupling agent 3 *10 | | 6.5 | | | | 6.5 | | | | | | | | 6.5 | | |
| Silane coupling agent 4 *11 | | | 6.5 | | | | 6.5 | | | | | | | | 6.5 | |
| Silane coupling agent 5 *12 | | | | 6.5 | | | | 6.5 | | | | | | | | 6.5 |
| Stearic acid | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 | 2.0 |
| Antioxidant 6C *13 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Zinc oxide | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 |
| Vulcanization accelerator DPG *14 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 | 1.0 |
| Vulcanization accelerator CZ *15 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Vulcanization accelerator DG *16 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |
| Sulfur | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Rolling resistance | 108 | 110 | 114 | 110 | 107 | 109 | 113 | 108 | 112 | 104 | 106 | 110 | 112 | 114 | 118 | 114 |
| Abrasion resistance | 102 | 104 | 101 | 106 | 101 | 104 | 100 | 106 | 100 | 105 | 101 | 101 | 100 | 102 | 100 | 105 |

Remarks:
*1 SBR #1712 (manufactured by JSR Corporation)
*2 SBR #1500 (manufactured by JSR Corporation)
*3 Seast 7HM (manufactured by Tokai Carbon Co., Ltd.)
*4 Nipsil AQ (manufactured by Nippon Silica Industry Co., Ltd.)
*5 Precipitated silica produced in Production Example F
*6 Premium 200MP (manufactured by Rhodia Co., Ltd.)
*7 Precipitated silica produced in Production Example G
*8 Si69 (bis(triethoxysilylpropyl) tetrasulfide) (manufactured by Degussa AG.)
*9 NXT Silane (chemical name: 3-octanoylthiopropyl-trimethoxysilane) (manufactured by Momentive Performance Materials Inc.)
*10 NXT-Z Silane (compound represented by Formula (V)) (manufactured by Momentive Performance Materials Inc.)
*11 Si363 (compound represented by Formula (X)) (manufactured by Degussa AG.)
*12 Compound represented by an average composition formula $(CH_3CH_2O)_3Si-(CH_2)_3-S-(CH_2)_6-S_{2.5}-(CH_2)_6-S-(CH_2)_3-Si(OCH_2CH_3)_3$ which was synthesized in the same manner as in Synthetic Examples 5 and 6
*13 Nocrac 6C (chemical name: N-(1,3-dimethylbutyl)-N'-phenyl-p-phenylenediamine) (manufactured by Ouchi Shinko Chemical Industrial Co., Ltd.)
*14 Nocceler D (chemical name: diphenylguanidine) (manufactured by Ouchi Shinko Chemical Industrial Co., Ltd.)
*15 Nocceler CZ (chemical name: N-cyclohexyl-2-benzothiazylsulfenamide) (manufactured by Ouchi Shinko Chemical Industrial Co., Ltd.)
*16 Nocceler DM (chemical name: benzothiazyl disulfide) (manufactured by Ouchi Shinko Chemical Industrial Co., Ltd.)

As apparent from the results shown in Table 2 and Table 3, tires produced by using the rubber compositions prepared in Examples 1 to 16 have small rolling resistance and high abrasion resistance as compared with tires produced by using the rubber compositions prepared in Comparative Examples 1 to 8.

The invention claimed is:

1. A pneumatic tire having a tread comprising a rubber composition containing 100 parts by mass of a rubber component comprising at least one of natural rubber and diene base synthetic rubber, 20 to 150 parts by mass of precipitated silica as a filler in which a cetyltrimethylammonium bromide-adsorbing specific surface area (CTAB) ($m^2$/g) and the mode $A_{ac}$ in diameters (nm) of primary aggregates determined by acoustic measurement of particle size distribution satisfy equation (A) shown below and in which a difference between an ignition loss (mass reduction % when heated at 750° C. for 3 hours) and a heating loss (mass reduction % when heated at 105° C. for 2 hours) satisfies equation (B) shown below and 1 to 25 parts by mass of at least one of compounds represented by the following Formulas (I), (II) and (X) and Average Composition Formula (VI) as a silane coupling agent:

$$A_{ac} \geq -0.76 \times (CTAB) + 274 \quad (A)$$

$$(\text{ignition loss}) - (\text{heating loss}) \leq 3 \quad (B)$$

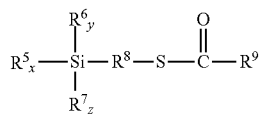

(I)

(wherein $R^5$ represents —Cl, —Br, $R^{10}$O—, $R^{10}$C(=O)O—, $R^{10}R^{11}$C=NO—, $R^{10}R^{11}$N— or —(OSiR$^{10}$R$^{11}$)$_b$ (OSiR$^9$R$^{10}$R$^{11}$); $R^6$ represents $R^5$, a hydrogen atom or a monovalent hydrocarbon group having 1 to 18 carbon atoms; $R^7$ represents $R^5$, $R^6$ or a —[O(R$^{12}$O)$_a$]$_{0.5}$—; $R^8$ represents a divalent hydrocarbon group having 1 to 18 carbon atoms; $R^9$ represents a monovalent hydrocarbon group having 1 to 18 carbon atoms; $R^{10}$ and $R^{11}$ each represent independently a hydrogen atom or a monovalent hydrocarbon group having 1 to 18 carbon atoms; $R^{12}$ represents an alkylene group having 1 to 18 carbon atoms; a is an integer of 1 to 4, and b is 1 to 4; and x, y and z are numbers satisfying a relation of x+y+2z=3, $0 \leq x \leq 3$, $0 \leq y \leq 2$ and $0 \leq z \leq 1$);

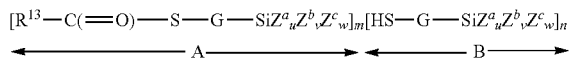

(II)

(wherein $R^{13}$ is a linear, branched or cyclic alkyl group having 1 to 20 carbon atoms; G each is independently an alkanediyl group or an alkenediyl group having 1 to 9 carbon atoms; $Z^a$ each is independently a group which can be bonded with two silicon atoms and is a group selected from [—O—]$_{0.5}$, [—O-G-]$_{0.5}$ or [—O-G-O—]$_{0.5}$; $Z^b$ each is independently a group which can be bonded to two silicon atoms and is a functional group represented by [—O-G-O—]$_{0.5}$; $Z^c$ each is independently —Cl, —Br or a functional group represented by —OR$^{14}$, R$^{14}$C(=O)O—, R$^{14}$R$^{15}$C=NO—, R$^{14}$R$^{15}$N—, R$^{14}$— or HO-G-O—, and R$^{14}$ and R$^{15}$ are a linear, branched or cyclic alkyl group having 1 to 20 carbon atoms; m, n, u, v and w each are independently $1 \leq m \leq 20$, $0 \leq n \leq 20$, $0 \leq u \leq 3$, $0 \leq v \leq 2$ and $0 < w \leq 1$, and ½u+v+2w=2 or 3; in a case of $m \geq 2$, $Z^a_u$, $Z^b_v$ and $Z^c_w$ in the plural A parts may be same or different each other, and in a case of $n \geq 2$, $Z^a_u$, $Z^b_v$ and $Z^c_w$ in the plural B parts may be same or different each other);

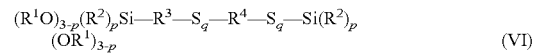

(VI)

(wherein $R^1$ and $R^2$ each are independently a hydrocarbon group having 1 to 4 carbon atoms; $R^3$ is a divalent hydrocarbon group having 1 to 15 carbon atoms; p is an integer of 0 to 2, and q is 1 or more and less than 4 in terms of an average value; and $R^4$ is a divalent functional group represented by any of the following Formulas (VII) to (IX):

(VII)

(VIII)

(IX)

wherein $R^e$ to $R^j$ are a linear or branched divalent hydrocarbon group having 1 to 20 carbon atoms, a divalent aromatic group or a divalent organic group containing a hetero element other than sulfur and oxygen, and $R^e$ to $R^j$ may be same or different from each other; and f, g and h are 1 or more and less than 4 in terms of an average value);

(X)

(wherein $R^a$ is methyl or ethyl; $R^b$O is methoxy or ethoxy; $R^c$ is an alkyl group having 1 to 9 carbon atoms; Y is a branched or non-branched and saturated or unsaturated divalent hydrocarbon group having 2 to 3 carbon atoms; the followings are an integer and i is 1 to 40; r is 0, 1 or 2; s is 0 or 1; t is 1 or 2; j is 1 to 9; and k is 1 to 4).

2. The pneumatic tire as described in claim 1, wherein the silane coupling agent is the compound represented by Formula (I).

3. The pneumatic tire as described in claim 2, wherein the silane coupling agent represented by Formula (I) is 3-octanoylthiopropyltrimethoxysilane.

4. The pneumatic tire as described in claim 1, wherein the silane coupling agent is the compound represented by Formula (II).

5. The pneumatic tire as described in claim 1, wherein the silane coupling agent represented by Formula (II) is a compound represented by any of Formulas (III) to (V):

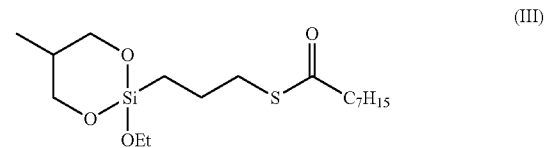

(III)

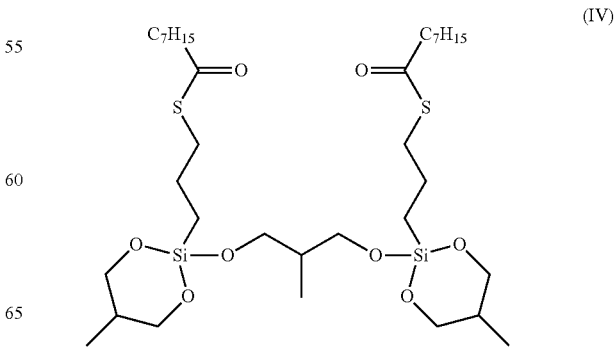

(IV)

-continued

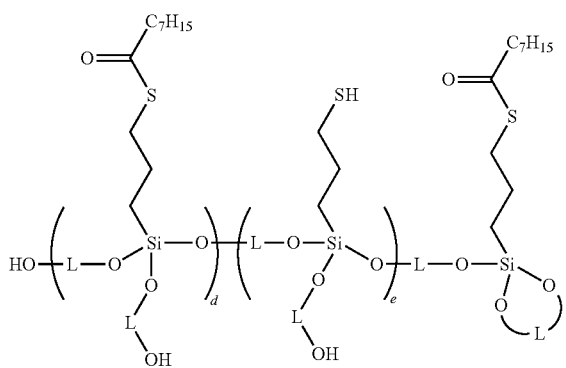

(V)

(wherein Et represents ethyl; L each is independently an alkanediyl group or an alkenediyl group having 1 to 9 carbon atoms; d=m−1 and e=n, and m and n have the same definitions as described in claim 1).

6. The pneumatic tire as described in claim 1, wherein the silane coupling agent is the compound represented by Average Composition Formula (VI).

7. The pneumatic tire as described in claim 6, wherein the silane coupling agent is the compound in which q is 1 in Formula (VI).

8. The pneumatic tire as described in claim 6, wherein the silane coupling agent is the compound in which $R^4$ in Formula (VI) is any of Formulas (VII) to (IX) and in which f, g and h in Formulas (VIII) and (IX) are 2 or more and 3 or less in terms of an average value.

9. The pneumatic tire as described in claim 6, wherein the silane coupling agent is the compound in which $R^4$ is Formula (IX) in Formula (VI).

10. The pneumatic tire as described in claim 9, wherein the silane coupling agent is the compound in which $R^4$ in Formula (VI) is Formula (IX) and in which $R^h$, $R^i$ and $R^j$ are hexylene.

11. The pneumatic tire as described in claim 1, wherein the silane coupling agent is the compound represented by Formula (X).

12. The pneumatic tire as described in claim 1, wherein a filler other than the precipitated silica is contained, and a compounding amount of the precipitated silica is 20% by mass or more based on the total amount of the fillers.

* * * * *